United States Patent [19]

Burns

[11] 4,406,011
[45] Sep. 20, 1983

[54] GAMMA THERMOMETER BASED REACTOR CORE LIQUID LEVEL DETECTOR

[75] Inventor: Thomas J. Burns, Knoxville, Tenn.

[73] Assignee: The United States of America as represented by the U.S. Department of Energy, Washington, D.C.

[21] Appl. No.: 274,121

[22] Filed: Jun. 16, 1981

[51] Int. Cl.³ .............................................. G21C 17/00
[52] U.S. Cl. ..................................... 376/247; 376/258
[58] Field of Search ............... 73/295 R; 376/247, 258

[56] References Cited

U.S. PATENT DOCUMENTS

| 3,280,627 | 10/1966 | Cousins et al. | 73/295 |
| 3,716,450 | 2/1973 | Lions | 376/247 |
| 4,053,874 | 10/1977 | Glaser | 73/295 |
| 4,298,430 | 11/1981 | Rolstad et al. | 376/247 |
| 4,320,656 | 3/1982 | Tiskus | 73/295 |

OTHER PUBLICATIONS

Nuc. Inst. & Meth., 63, pp. 300–306 (1968) "Fast Response Gamma Thermometers", J. S. Stutheit.
IEEE Trans. on Nuc. Sci., vol. NS-26, 1 (2/79), "Gamma Thermomoeter Development for LWR's", Leyse et al., pp. 934–942.

Primary Examiner—Sal Cangialosi
Attorney, Agent, or Firm—David E. Breeden; Stephen D. Hamel; Richard G. Besha

[57] ABSTRACT

A system is provided which employs a modified gamma thermometer for determining the liquid coolant level within a nuclear reactor core. The gamma thermometer which normally is employed to monitor local core heat generation rate (reactor power), is modified by thermocouple junctions and leads to obtain an unambiguous indication of the presence or absence of coolant liquid at the gamma thermometer location. A signal processor generates a signal based on the thermometer surface heat transfer coefficient by comparing the signals from the thermocouples at the thermometer location. The generated signal is a direct indication of loss of coolant due to the change in surface heat transfer when coolant liquid drops below the thermometer location. The loss of coolant indication is independent of reactor power at the thermometer location. Further, the same thermometer may still be used for the normal power monitoring function.

4 Claims, 9 Drawing Figures

THERMOCOUPLE OUTPUT LEADS

GAMMA THERMOMETER BASED REACTOR CORE LIQUID LEVEL DETECTOR

This invention relates generally to liquid level monitoring, and more particularly, to liquid level detectors for monitoring the coolant level in a liquid-cooled nuclear reactor core. It is the result of a contract with the U.S. Department of Energy.

BACKGROUND OF THE INVENTION

A primary concern in the operation of a pressurized water reactor (PWR) is the level of coolant within the reactor core vessel. A drop in coolant level which uncovers the core can result in significant damage to the core. Due primarily to the hostile environment within the reactor vessel, there is presently no device in use for direct measurement of the reactor core coolant level.

In the art, it has been the practice to infer the core coolant level from temperature and pressure measurements made external of the core in the core coolant loop. This method sometimes results in incorrect conclusions as to the coolant level in the core because measurements taken external to the reactor core do not necessarily reflect the core conditions. Clearly, there is a need for a direct means of measuring the coolant level in a liquid-cooled nuclear reactor core.

SUMMARY OF THE INVENTION

In view of the above need, it is an object of this invention to provide a system for direct measurement of the coolant level in the core of a nuclear reactor.

Another object of this invention is to provide a nuclear reactor core liquid-coolant level detector which does not require the utilization of additional space within the reactor core.

Other objects, advantages, and novel features of the invention will be set forth in part, in the description which follows, and in part, will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the nuclear reactor core liquid level detector of this invention may comprise at least one gamma thermometer disposed within the reactor core. A dual differential thermocouple configured electrically and located geometrically within the gamma thermometer sensing region to provide a pair of voltage signals at separate outputs thereof, the ratio of which is indicative of the surface heat transfer at the sensing region. A signal processing circuit is provided for producing an output signal proportional to the ratio of the pair of voltage signals which is indicative of the presence or absense of core coolant at the sensing region level.

BRIEF DESCRIPTION OF THE DRAWINGS

The accompanying drawings, which are incorporated in and form a part of the specification, together with the description, serve to explain the principles of the invention. In the drawings.

DETAILED DESCRIPTION

Figure 1:
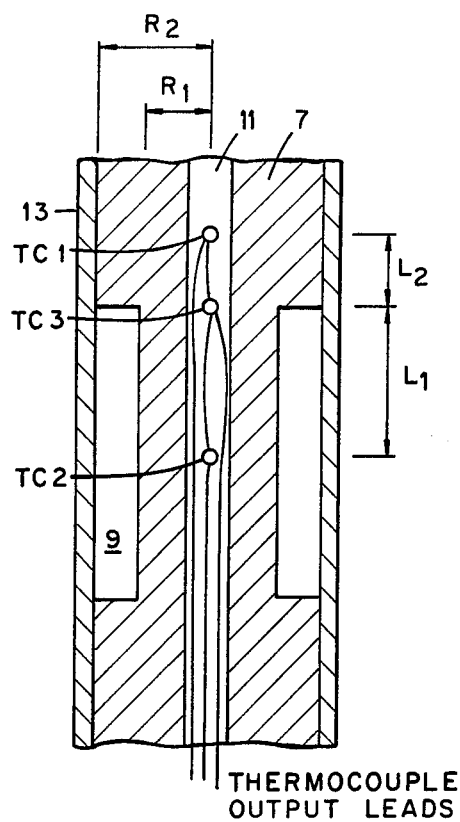
FIG. 1 is a cross-sectional view of a section of a gamma thermometer modified in accordance with the present invention to determine the liquid level within a nuclear reactor core.

The gamma thermometer was originally developed as an indicator of local power generation in a water cooled reactor. These thermometers are located throughout the reactor core and respond to gamma ray heating. At present, they are still employed solely for that purpose. FIG. 1 shows one of several gamma thermometers that are normally arrayed along a length of rod which occupies a rod location in a PWR core. In this design, which is the basis for this invention, a gamma heated member comprising a hollow cylindrical rod 7 (usually of stainless steel) is provided which has a length equal to or greater than the height of the reactor core. At intervals along the rod length, annuli of material are removed by machining to form a thermal sensing region by forming a thermal resistance zone chamber 9. Only thermocouples $TC_1$ and $TC_2$, connected as a differential thermocouple pair, are placed in the central bore 11 of the rod at locations with respect to one of the annuli for a conventional gamma thermometer. The thermocouple leads also occupy the central bore. Once assembled, a cladding 13, usually of stainless steel, zircaloy, etc., is swagged onto the exterior of the rod 7 in an argon-gas atmosphere to form a gas-filled thermal resistance zone chamber 9 around the thermocouple $TC_2$ location. The completed array of gamma thermometers occupies a rod location in the core and is in direct contact with the core coolant.

During reactor operation, gamma radiation is produced in the fission process and by decay of fission products. A fraction of these gamma rays interact with the stainless steel body of the gamma thermometer, depositing energy and producing heat. This heat is then transferred from the device to the coolant in which it is immersed. The presence of this volumetric heat source produces a temperature distribution within the device that is measured by the thermocouples $TC_1$ and $TC_2$ as follows. The radial heat flow at the $TC_2$ location is sharply reduced due to the insulating gas gap. The heat flow in this region is principally in the logitudinal direction. In contrast, the radial heat flow at the $TC_1$ location is relatively unrestricted. The differential heat transfer results in a higher temperature at location $TC_2$.

Figure 2:
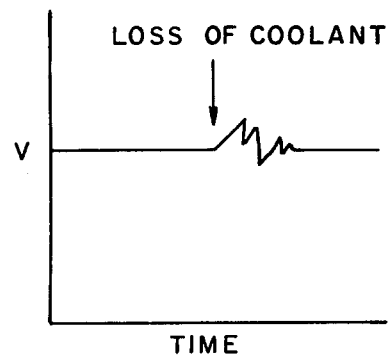
FIG. 2 is a graphic illustration of the response of a conventional gamma thermometer to a loss of coolant at the thermometer sensitive region.

Since the energy deposition rate within the device from the gamma rays is proportional to the reactor power, a change in the reactor power will produce the desired change in the differential thermocouple signal. Should there be a loss of coolant around the device, the radial heat transfer characteristics of both junctions will become similar, i.e., they both become solid-gas interfaces. The temperature differential between them will be initially reduced and higher absolute temperatures for both locations will result, assuming the source term remains constant. The thermocouple output voltage would show only a slight change as shown in FIG. 2 and might go unnoticed.

Figure 3:
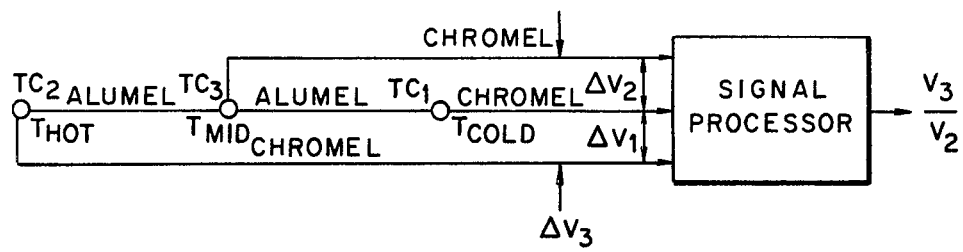
FIG. 3 is a schematic circuit diagram of the gamma thermometer/liquid-level detector according to the present invention.

In accordance with the present invention, the standard differential thermocouple normally located in the central axial passage is replaced by a dual differential thermocouple assembly including a third thermocouple $TC_3$. The dual differential thermocouple provides two distinct voltages indicative of the temperature differences between the locations of the thermocouple junctions as illustrated in FIG. 3. In this embodiment, $\Delta V_3$ is indicative of the temperature difference between the location of the "hot" thermocouple ($TC_2$) junction and the mid-termperature thermocouple junction ($TC_3$). $\Delta V_2$ is indicative of the temperature difference between the mid junction ($TC_3$) and the "cold" junction $TC_1$. A third signal $\Delta V_1$, equal to the sum of $\Delta V_3$ and $\Delta V_2$, corresponds to the conventional gamma thermometer signal which is indicative of the temperature difference between the "hot" thermocouple junction and the "cold" junction. It will be understood that the thermomcouple assembly according to the present invention is termed a "dual" defferential thermocouple to distinguish it from the normal double differential thermocouple assembly used for power measurements which is two differential thermocouples connected in series ($TC_1$ and $TC_2$).

The signal processor shown in FIG. 3 consists of conventional logic circuits to combine the two differential voltage ($\Delta V_3$ and $\Delta V_2$) to produce an output signal R, where $$R = \frac{\Delta V_3}{\Delta V_2} = \frac{V_{Hot} - V_{Mid}}{V_{Mid} - V_{Cold}},$$

R is directly related to the surface heat transfer coefficient, and $\Delta V_3$ and $\Delta V_2$ are the differential voltages from the thermocouple assembly. $V_{Cold}$, $V_{Mid}$, and $V_{Hot}$ are the absolute voltages corresponding to the thermocouple locations $TC_1$, $TC_2$, and $TC_3$, respectively, and indicative of the absolute temperature at these points. Since $(T_{Hot}-T_{Mid})$ and $(T_{Mid}-T_{Cold})$ are both porportional to the volumetric heat source, their signal ratio is independent of the heat source and hence independent of the reactor power. The coolant level, in other words, is directly inferred from the magnitude of the measured heat transfer coefficient. This result is best seen in the one-dimensional theoretical results as follows:

$$\frac{(T_{Hot} - T_{Mid})}{(T_{Mid} - T_{Cold})} = \frac{\frac{mL_1R_2^2}{2R_1^2}(1 - e^{-2mL_2})}{[(1 + e^{-2mL_2}) - 2e^{-mL_2}]}$$

The parameter $$m = \left(\frac{hP}{KA}\right)^{\frac{1}{2}}$$

where h is the surface heat transfer coefficient, P is the wetted perimeter, K is the thermal conductivity of the core rod, and A is the cross-sectional area of the core rod. The parameters L and R are distances as shown in FIG. 1.

Figure 4:
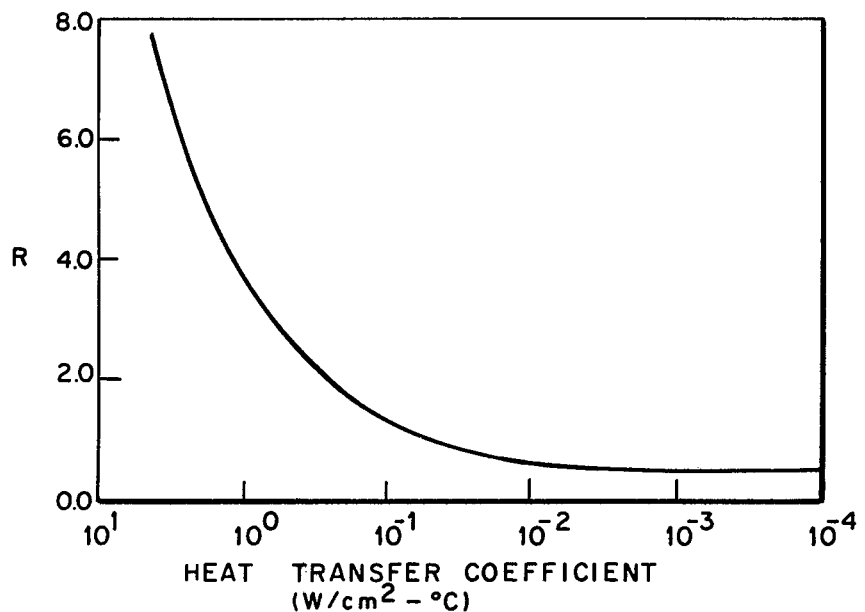
FIG. 4 is a graphic illustration of the response characteristics of the detector of FIG. 3.

FIG. 4 presents the results of an approximate thermal analysis of the signal ratio, R, in a PWR as a function of the surface heat transfer coefficient. As indicated, a loss of coolant will result in a dramatic decrease (roughly a factor of 14) in the signal ratio R.

Figure 5:
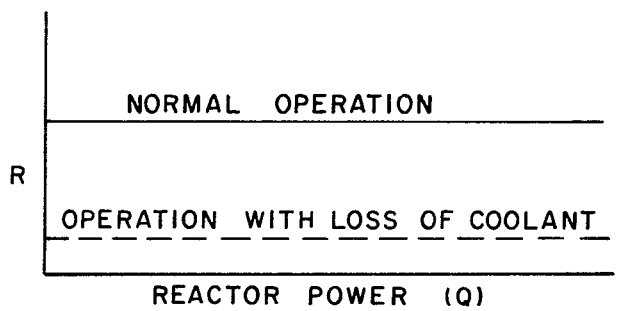
FIG. 5 is a graphic illustration of the response of the level indicator to a loss of coolant.
Figure 6:
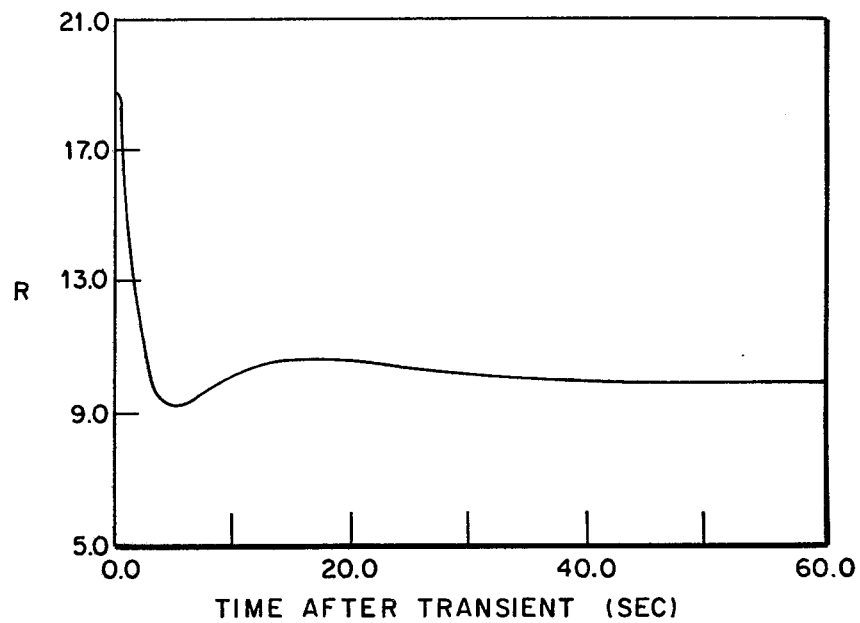
FIG. 6 is a graphic illustration of the level indicator transient response.

FIG. 5 shows the response characteristics of the signal ratio as a function of the reactor power level, Q. As indicated,, the signal ratio is independent of the power level for constant values of the surface heat transfer coefficient. A change in the heat transfer coefficient caused by the loss of reactor coolant will produce a new signal ratio (also independent of the power level). Assuming the usual axially-spaced string of gamma thermometers arranged along a rod length, loss of coolant at a particular gamma thermometer will result in a change in that gamma thermometer's signal ratio as indicated by the results in FIG. 6. The curve represents the fluid level response in going from normal operation to a condition with no coolant (i.e., the solid line to the dashed line in FIG. 5). The very evident decrease in the signal level provides an immediate indication of the loss of core coolant at that level in the core. This signal change may be used to trigger an alarm circuit as well as to notify an operator.

The present invention can be designed as a stand-alone coolant level indicator, but the dual-purpose device may be the preferred embodiment. This would be even more so if gamma thermometers should replace neutron monitors as the primary means of measuring reactor power in PWR's.

In the preferred embodiment (previously described), the extra thermocouple junction, denoted as $T_{Mid}$, serves to provide a reference temperature for comparison with $T_{Hot}$ and $T_{Cold}$. In an alternate embodiment, an external reference temperature, that of the reactor coolant, may be utilized.

Figure 7:
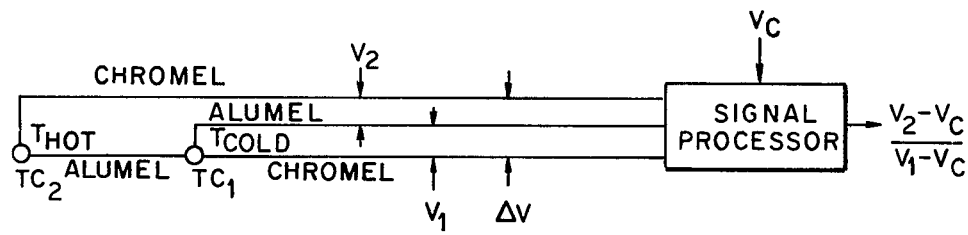
FIG. 7 is a schematic illustration of an alternate embodiment of a reactor core coolant level detector according to the present invention.

This is shown schematically in FIG. 7 where a third electrical lead is added to a conventional gamma thermometer thermocouple assembly at $TC_1$ so that in addition to the differential voltage of the two thermocouples, an absolute voltage of one of the thermocouples is obtained. The thermocouples are then located as in a conventional gamma thermometer. In the embodiment shown in FIG. 7, an alumel lead is added to a chromel-alumel thermocouple to obtain the temperature of the thermocouple $TC_1$ junction.

Figure 8:
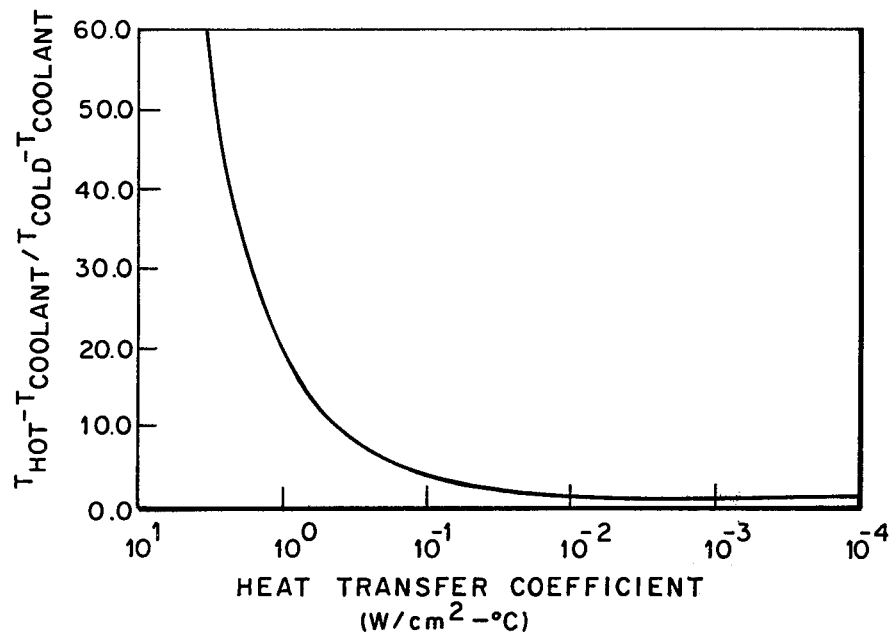
FIG. 8 is a graphic illustration of the response characteristics of the embodiment of FIG. 7.

The signal processor shown in FIG. 7 consists of logic devices that combine the two thermocouple voltages together with a voltage ($V_c$) indicative of the core exiting coolant temperature to produce the signal ratio $R_2$ given by $$R_2 = \frac{V_2 - V_c}{V_1 - V_c}$$

which is indicative of $(T_2-T_c)/(T_1-T_c)$. In this equation, R is directly related to the surface heat transfer coefficient, $T_c$ is the coolant temperature (available in PWR's through existing thermocouples in the coolant inlet and outlet openings to the core), and $V_1$, and $V_2$, and $V_c$ are the respective voltage signals from the $TC_1$, $TC_2$ and coolant thermocouples. Again, since $(T_1-T_c)$ and $(T_2-T_c)$ are both proportional to the volumetric heat source, their signal ratio is independent of the heat source and hence independent of the reactor power. The resulting device has a similar, but not indentical response to change in the surface heat transfer coefficient, as depicted in FIG. 8.

The alternate embodiment produces a larger change in the signal ratio for a given change in the heat transfer coefficient. However, the signal processor required by the alternate embodiment would be more complex since the use of the dual differential thermocouple in the preferred embodiment essentially hardwires certain of the alternate signal processor's functions into the sensor device itself. Additionally, the alternate embodiment requires an external signal, that of the coolant temperature, while the preferred embodiment is self-contained.

Figure 9:
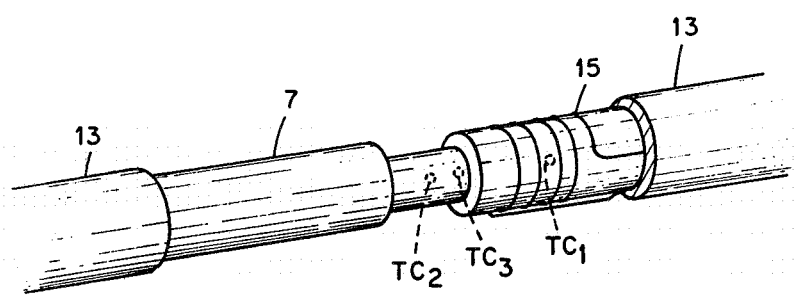
FIG. 9 is a partially sectioned view of a gamma level detector incorporating a heating coil for in situ calibration.

Referring now to FIG. 9, where like reference characters refer to like parts in FIG. 1, an electrical heating element 15, such as nichrome wire, is added as part of the sensor, two additional features are obtained. It will be noted that in FIG. 9 the heating element is wound around the larger diameter section of the core rod for clarity. Placement of the heater around the narrower section of the core rod at the chamber 9 location may be preferable, however.

The internal heating element will permit the subject indicator to function as a liquid level indicator within the coolant-filled region above the reactor core in a PWR. Due to the low gamma flux level in this region, the volumetric heat source generated in the core rod will be insufficient to produce a readily interpreted temperature distribution within the gamma thermometer. By applying a constant current to the heating element, a temperature distribution analogous to that generated within the core by the gamma flux can be generated, and the resultant signal ratio interpreted as previously described.

The second feature that is possible by incorporating a heating element is one of in situ calibration for both the power level and liquid level functions. Such recalibration would consist of applying a known electric current and voltage to the heater element when the recalibration is desired, thereby generating a known heat source in the device together with measurements in the resulting change in thermocouple signals.

Thus, it will be seen that a system is provided for direct in-core coolant level detection for a liquid-cooled nuclear reactor. The in-core location of the sensor eliminates problems encountered in the process of inferring liquid level from coolant temperatures and pressure measurements. It does not require additional reactor core space and requires a minimal number of electrical leads per device.

The foregoing description of two embodiments of the invention has been presented for purposes of illustration and description. It is not intended to be exhaustive or to limit the invention to the precise form disclosed, and obviously may modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A nuclear reactor core liquid-level detector comprising:

at least one elongated gamma heated member disposed within said reactor core and submerged in reactor core coolant during normal operation, said gamma heated member including a central bore, at least one axially extending thermal sensing region having a first portion formed by a circumferential thermal resistance zone to inhibit radial heat flow in said first portion of said thermal sensing region thereby forming a hot zone in said sensing region and a second portion axially adjacent said first portion having no means to inhibit radial heat flow thereby forming a relatively cold zone in said sensing region, and a mid zone at a transition between said first portion and said second potion and a dual differential thermocouple assembly disposed in said central bore at said sensing region having a first thermocouple junction located at said cold zone, and a second thermocouple junction located at said hot zone, and a third thermocouple junction located at said mid zone, each of said first, second and third thermocouple junctions being connected electrically in series to provide a first voltage signal ($\Delta V_3$) between said first and third thermocouple junctions which is proportional to the difference in temperature between said hot zone and said mid zone ($T_{hot}-T_{mid}$) and a second voltage signal ($\Delta V_2$) between said second and third thermocouple junctions which is proportional to the difference in temperature between said mid zone and said cold zone ($T_{mid}-T_{cold}$); and a signal processing means responsive to said first and second voltage signals for generating an output signal proportional to the ratio of said first voltage signal to said second voltage signal ($\Delta V_3/\Delta V_2$) which is indicative of the presence or absence of core coolant at said sensing region.

2. The liquid-level detector as set forth in claim 1 wherein said gamma heated member includes a cylindrical rod formed of a heat conducting material which is heated by a gamma flux and wherein said circumferential thermal resistance zone includes an annular chamber partially formed by a reduced diameter section of said rod and a tubular cladding surrounding said rod in a close fitting arrangement so that the inner wall thereof closes said annular chamber.

3. The liquid-level detector as set forth in claim 2 wherein said gamma heated member is formed of steel and said tubular outer wall section is formed of zircaloy.

4. The liquid-level detector as set forth in claim 2 further including argon gas filling said annular chamber.

* * * * *